(12) United States Patent
Nitta

(10) Patent No.: US 9,325,743 B2
(45) Date of Patent: Apr. 26, 2016

(54) INFORMATION PROCESSING APPARATUS, METHOD, AND PROGRAM

(75) Inventor: Minoru Nitta, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 831 days.

(21) Appl. No.: 13/164,365

(22) Filed: Jun. 20, 2011

(65) Prior Publication Data
US 2012/0005373 A1   Jan. 5, 2012

(30) Foreign Application Priority Data

Jun. 30, 2010   (JP) .................................. 2010-150425

(51) Int. Cl.
G06F 15/16 (2006.01)
H04L 29/06 (2006.01)
(52) U.S. Cl.
CPC ............ *H04L 65/1006* (2013.01); *H04L 69/22* (2013.01)
(58) Field of Classification Search
None
See application file for complete search history.

(56) References Cited

U.S. PATENT DOCUMENTS

| 2001/0047279 | A1* | 11/2001 | Gargone ........................... 705/1 |
| 2003/0172127 | A1* | 9/2003 | Northrup et al. .............. 709/219 |
| 2005/0060643 | A1* | 3/2005 | Glass et al. ................. 715/501.1 |
| 2005/0246426 | A1* | 11/2005 | Motoyama et al. ........... 709/209 |
| 2005/0278442 | A1* | 12/2005 | Motoyama et al. ........... 709/224 |
| 2007/0121622 | A1* | 5/2007 | Zhu et al. ....................... 370/389 |
| 2007/0150604 | A1* | 6/2007 | Batteram ....................... 709/228 |
| 2008/0288549 | A1* | 11/2008 | Rabetge et al. ............... 707/200 |
| 2010/0088756 | A1* | 4/2010 | Balakrishnan et al. ......... 726/13 |
| 2010/0274896 | A1* | 10/2010 | Nooner et al. ................ 709/224 |

FOREIGN PATENT DOCUMENTS

JP        2003-234750        8/2003

* cited by examiner

*Primary Examiner* — Philip Chea
*Assistant Examiner* — Van Kim T Nguyen
(74) *Attorney, Agent, or Firm* — Oblon, McClelland, Maier & Neustadt, L.L.P.

(57) ABSTRACT

An information processing apparatus includes: a memory configured to store a first group of character strings each of which corresponds to a header name defined in accordance with a communication protocol for communication, a second group of character strings each of which corresponds to a character string that is obtained by converting the character strings of the first group into lower case letters or upper case letters, and a third group of character strings each of which is not identical to any of the character strings of the first group, the character strings of the third group being extracted from a signal received; an extracting unit configured to extract a header value from another signal received from the other communication apparatus when a header name included in the other signal is identical to any character string of the first group, or the third group, or the second group.

18 Claims, 17 Drawing Sheets

FIG. 3

3001 { REGISTER sip:123.456.789.789 SIP/2.0
     From: "abc" <sip:abc@sipas.fujitsu.com>;tag=1838-a7-2e-8f-cd361869
     Via: SIP/2.0/UDP 123.456.789.012:35070;branch=
     z9hG4bK-07d902120e270600f0-16
3002 {   Max-Forwards: 70
         To: <sip:abc@sipas.fujitsu.com>
         CSeq: 16 REGISTER
     Call-Id: 07d902120e270600f0@123.456.789.012
         Content-Length: 0
     Contact: <sip:abc@123.456.789.012:35070>

FIG. 4

| KEY | DEFINED HEADER NAME |
|---|---|
| From | From |
| Via | Via |
| Max-Forwards | Max-Forwards |
| To | To |
| CSeq | CSeq |
| Call-Id | Call-Id |
| Content-Length | Content-Length |
| Contact | Contact |
| ... | ... |

FIG. 5

| KEY | DEFINED HEADER NAME |
|---|---|
| from | From |
| via | Via |
| max-forwards | Max-Forwards |
| to | To |
| cseq | CSeq |
| call-id | Call-Id |
| content-length | Content-Length |
| contact | Contact |
| ... | ... |

FIG. 6

| KEY | DEFINED HEADER NAME |
|-----|---------------------|
| ViA | Via |
| ... | ... |
| ... | ... |
| ... | ... |
| ... | ... |

FIG. 7

| HEADER NAME | HEADER VALUE |
|---|---|
| From | "abc" <sip:abc@sipas.fujitsu.com>;tag=1838-a7-2e-8f-cd361869 |
| Via | SIP/2.0/UDP 123.456.789.012:35070;branch=z9hG4bK-07d902120e270600f0-16 |
| Max-Forwards | 70 |
| ... | ... |
| ... | ... |

FIG. 8

| TRANSACTION ID | TRANSACTION TYPE | SESSION START TIME | STATE |
|---|---|---|---|
| 0001 | INVITE | 14:50:03 on March 3, 2010 | END |
| 0002 | REGISTER | 14:52:01 on March 3, 2010 | END |
| 0003 | INVITE | 14:52:45 on March 3, 2010 | TEMPORARY RESPONSE |
| ... | ... | ... | ... |

FIG. 9

| DIALOG ID | CALL-ID | FROM | TO | CALL INFORMATION |
|---|---|---|---|---|
| aaaaa | a-11111 | 0010001 | 0020001 | 14:50:17 on March 3, 2010 - 14:55:23 on March 3, 2010 |
| bbbbb | b-11111 | 0010010 | 0020010 | 14:58:03 on March 3, 2010 |
| ... | ... | ... | ... | ... |

FIG. 10

```
REGISTER sip:123.456.789.789 SIP/2.0
From: "abc" <sip:abc@sipas.fujitsu.com>;tag=1838-a7-2e-8f-cd361869
ViA: SIP/2.0/UDP 123.456.789.012:35070;branch=z9hG4bK-07d902120e270600f0-16
Max-Forwards: 70
To: <sip:abc@sipas.fujitsu.com>
CSeq: 16 REGISTER
Call-IDNo: 07d902120e270600f0@123.456.789.012
Content-Length: 0
conTact: <sip:abc@123.456.789.012:35070>
```

FIG. 11

| KEY | DEFINED HEADER NAME |
|---|---|
| ViA | Via |
| conTact | Contact |
| ... | ... |
| ... | ... |

FIG. 12

| HEADER NAME | HEADER VALUE |
|---|---|
| From | "abc" <sip:abc@sipas.fujitsu.com>;tag=1838-a7-2e-8f-cd361869 |
| Max-Forwards | 70 |
| To | <sip:abc@sipas.fujitsu.com> |
| Cseq | 16 REGISTER |
| Content-Length | 0 |
| Via | SIP/2.0/UDP 123.456.789.012:35070;branch=z9hG4bK-07d902120e270600f0-16 |
| call-idno | 07d902120e270600f0@123.456.789.012 |
| Contact | <sip:abc@123.456.789.012:35070> |

FIG. 16

RELATED ART

```
REGISTER sip:123.456.789.789 SIP/2.0
From: "abc" <sip:abc@sipas.fujitsu.com>;tag=1838-a7-2e-8f-cd361869
Via: SIP/2.0/UDP 123.456.789.012:35070;branch=z9hG4bK-07d902120e270600f0-16
Max-Forwards: 70
To: <sip:abc@sipas.fujitsu.com>
CSeq: 16 REGISTER
Call-ID: 07d902120e270600f0@123.456.789.012
Content-Length: 0
Contact: <sip:abc@123.456.789.012:35070>
```

↓

ANALYSIS RESULT OBJECT

| HEADER NAME | HEADER VALUE |
|---|---|
| From | "abc" <sip:abc@sipas.fujitsu.com>;tag=1838-a7-2e-8f-cd361869 |
| Via | SIP/2.0/UDP 123.456.789.012:35070;branch=z9hG4bK-07d902120e270600f0-16 |
| Max-Forwards | 70 |
| ⋮ | ⋮ |

INFORMATION PROCESSING APPARATUS, METHOD, AND PROGRAM

CROSS-REFERENCE TO RELATED APPLICATIONS

This application is based upon and claims the benefit of priority of the prior Japanese Patent Application No. 2010-150425, filed on Jun. 30, 2010, the entire contents of which are incorporated herein by reference.

FIELD

The present invention relates to information processing apparatuses, information processing methods, and information processing programs.

BACKGROUND

Hitherto, a SIP server has been used which connects between terminals over an IP (Internet Protocol) network by using SIP (Session Initiation Protocol). In the SIP server, an application is implemented which performs processing of sound and/or moving picture communication between the connected terminals. The SIP server performs call control on the basis of the result of analysis on a received SIP signal. The application on the SIP server performs processing on the basis of the result of analysis on a SIP signal by the SIP server.

With reference to FIG. 16, an example of analysis processing on a SIP signal to be performed by the SIP server will be described. FIG. 16 illustrates an example of a SIP signal to be received by a SIP server. The analysis processing on a SIP signal extracts an arbitrary value from a header having a header name and a header value. The header name may be "From", "Via", "Max-Forwards" or the like as illustrated in FIG. 16, and ":" after each header name is followed by a header value.

For example, a SIP server extracts "'abc' <sip:abc@sipas.fujitsu.com>;tag=1838-a7-2e-8f-cd361869" as the header value corresponding to the header name "From" illustrated in FIG. 16. The SIP server creates an analysis result object having correspondence between the extracted header value "'abc' <sip:abc@sipas.fujitsu.com>;tag=1838-a7-2e-8f-cd361869" and the header name "From".

The SIP signal analysis processing defines the character string of the header name to be analyzed dependent on uppercase letters and lowercase letters under SIP. However, a source terminal transmits a SIP signal having a header name containing a character string generated originally by the terminal independent of the protocol. In other words, a SIP server may receive a header name containing a character string having different sensitivity to uppercase letters and lowercase letters from those of a character string of a header name defined under the SIP protocol.

For example, though the character string of a header name defined under the SIP protocol is "From", a SIP server may receive a SIP signal having "froM" as the character string of the header name. In this case, the SIP server may be required to perform complicated processing for determining that "froM" corresponds to "From". More specifically, the SIP server may be required to store information on a combination of all character strings which can be recognized as the defined character string "From" and search "froM" from the stored information.

In this way, in order to prevent the complicated analysis processing on a SIP signal, a well known method has been implemented in which a SIP server coercively converts a header name contained in a received SIP signal to uppercase letters or lowercase letters.

With reference to FIG. 17, there will be described the method which coercively converts a header name contained in a SIP signal to uppercase letters or lowercase letters. FIG. 17 illustrates an example of the method which coercively converts a header name contained in a SIP signal to uppercase letters or lowercase letters. As illustrated in FIG. 17, for example, when a SIP server receives a SIP signal having a header name "froM", the SIP server may convert the character string of the header name to lowercase letters "from". The SIP server may convert the character string "From" of the defined header name to lowercase letters "from". The SIP server may search the header name which is matched with lowercase letters "from" converted from "froM". The SIP server may determine that the character string "From" of the defined header name is matched with the converted lowercase letters "from". In other words, the SIP server may determine that the received header name "froM" corresponds to "From". The SIP server may then create an analysis result object having correspondence between the header value "'abc' <sip:abc@sipas.fujitsu.com>;tag=1838-a7-2e-8f-cd361869" extracted from the header name "froM" of the SIP signal and the header name "from" as a result of the conversion to lowercase letters. The same is true in the method which coercively converts the header name contained in a SIP signal to uppercase letters.

Similarly, the complicated processing can be prevented by coercively converting a header name to uppercase letters or lowercase letters by a SIP server if the acquisition of a header value corresponding to the header name is requested from an application present on the SIP server. As illustrated in FIG. 17, for example, if the SIP server is requested to acquire the header value corresponding to the header name "FROM" by an application, the SIP server converts the character string "FROM" to "from". The SIP server then searches the header name matched with "from" as a result of conversion of the character string "FROM" to lowercase letters from the analysis result object. The SIP server extracts the header value "'abc' <sip:abc@sipas.fujitsu.com>;tag=1838-a7-2e-8f-cd361869" corresponding to "from" from the analysis result object and notifies it to the application.

SUMMARY

According to an aspect of the embodiment, an information processing apparatus includes: a memory configured to store a first group of one or more character strings each of which corresponds to a header name defined in accordance with a communication protocol for communication between the information processing apparatus and another communication processing apparatus, a second group of one or more character strings each of which corresponds to a character string that is obtained by converting the one or more character strings of the first group into lower case letters or upper case letters, and a third group of one or more character strings each of which is not identical to any of the one or more character strings of the first group, the one or more character strings of the third group being extracted from a signal received; an extracting unit configured to extract a header value from another signal received from the other communication apparatus when a header name included in the other signal is determined to be identical to any character string of the first group, or when the header name included in the other signal is not determined to be identical to any character string of the first group but determined to be identical to any character string of the third group, or when the header name included in the other signal is not determined to be identical to any character string of the first and third groups and a character string obtained by converting the header name in the other signal into lower case letters or upper case letters is identical to any character string of the second group, the determination of the first to third groups being performed in order of the first group to the third group to the second group.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF THE DRAWINGS

FIG. 3 illustrates an example of a SIP signal received by a signal receiving unit;

FIG. 4 illustrates an example of information stored in a first table;

FIG. 5 illustrates an example of information stored in a second table;

FIG. 6 illustrates an example of information stored in a third table;

FIG. 7 illustrates an example of an analysis result object stored in a header management table;

FIG. 8 illustrates an example of information stored in a transaction management table;

FIG. 9 illustrates an example of information stored in a dialog management table;

FIG. 10 illustrates an example of a SIP signal to be analyzed by a signal analyzing unit;

FIG. 11 illustrates an example of information stored in a third table by the signal analyzing unit;

FIG. 12 illustrates an example of an analysis result object created by the signal analyzing unit;

FIG. 16 illustrates an example of a SIP signal to be received by a SIP server.

DESCRIPTION OF EMBODIMENTS

The aforementioned art in the past has a problem that it is difficult to efficiently perform analysis processing on a received signal.

More specifically, because a SIP signal received by a SIP server has many pairs of a header name and a header value, the SIP server is required to convert the character strings of many header names to uppercase letters or lowercase letters every time the SIP server receives a signal. Furthermore, when a SIP server receives a signal repeatedly from a specific terminal, the SIP server receives signals having the same header name as the one having the character string converted once. In other words, every time a SIP server receives a signal, the SIP server must convert again the header name having the character string converted once.

A SIP server may receive a request signal which requests connection between terminals, for example, from a connection source terminal and transfers the received request signal to a connection destination terminal. The SIP server receives a response signal to the request from the connection destination terminal and transfers the received response signal to the connection source terminal. In this case, the SIP server may often receive a response signal generated by copying the header of the request signal. As a result, the SIP server may receive a response signal having the same character string as the character string of the header name converted in analysis on the request signal. In other words, every time the SIP server receives a response signal, the SIP server must convert again the header name having the character string converted once.

When a SIP server is requested to acquire the header value corresponding to the header name from an application present on the SIP server, the SIP server converts the character string of the header name and searches the corresponding header value. A SIP server may be requested the header value acquisition normally over a plurality of number of times from an application. Thus, the SIP server must convert the character strings of the header names even if they are the header name having the character string converted before every time the acquisition of the header value is requested. As a result, it may be difficult for the SIP server to perform efficient SIP signal analysis processing.

Hereinafter, embodiments of an information processing apparatus, information processing method, and information processing program disclosed by the subject application will be described in detail with reference to drawings. Those embodiments do not limit the present invention.

First Embodiment

Network Configuration of SIP Server

Figure 1:
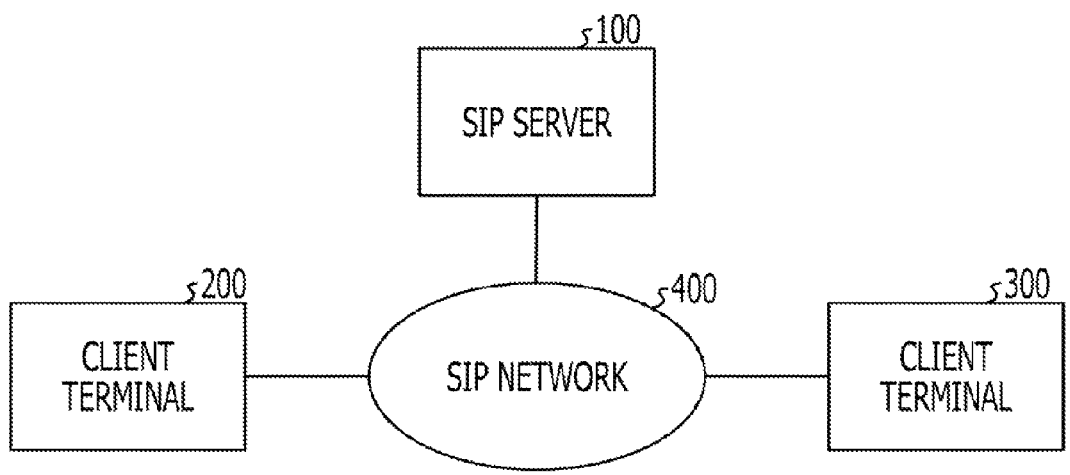
FIG. 1 illustrates a network configuration of a SIP server according to a first embodiment.

FIG. 1 illustrates a network configuration of a SIP server 100 according to a first embodiment. As illustrated in FIG. 1, the SIP server 100 according to the first embodiment connects a client terminal 200 and a client terminal 300 through a SIP network 400.

[Configuration of SIP Server]

Figure 2:
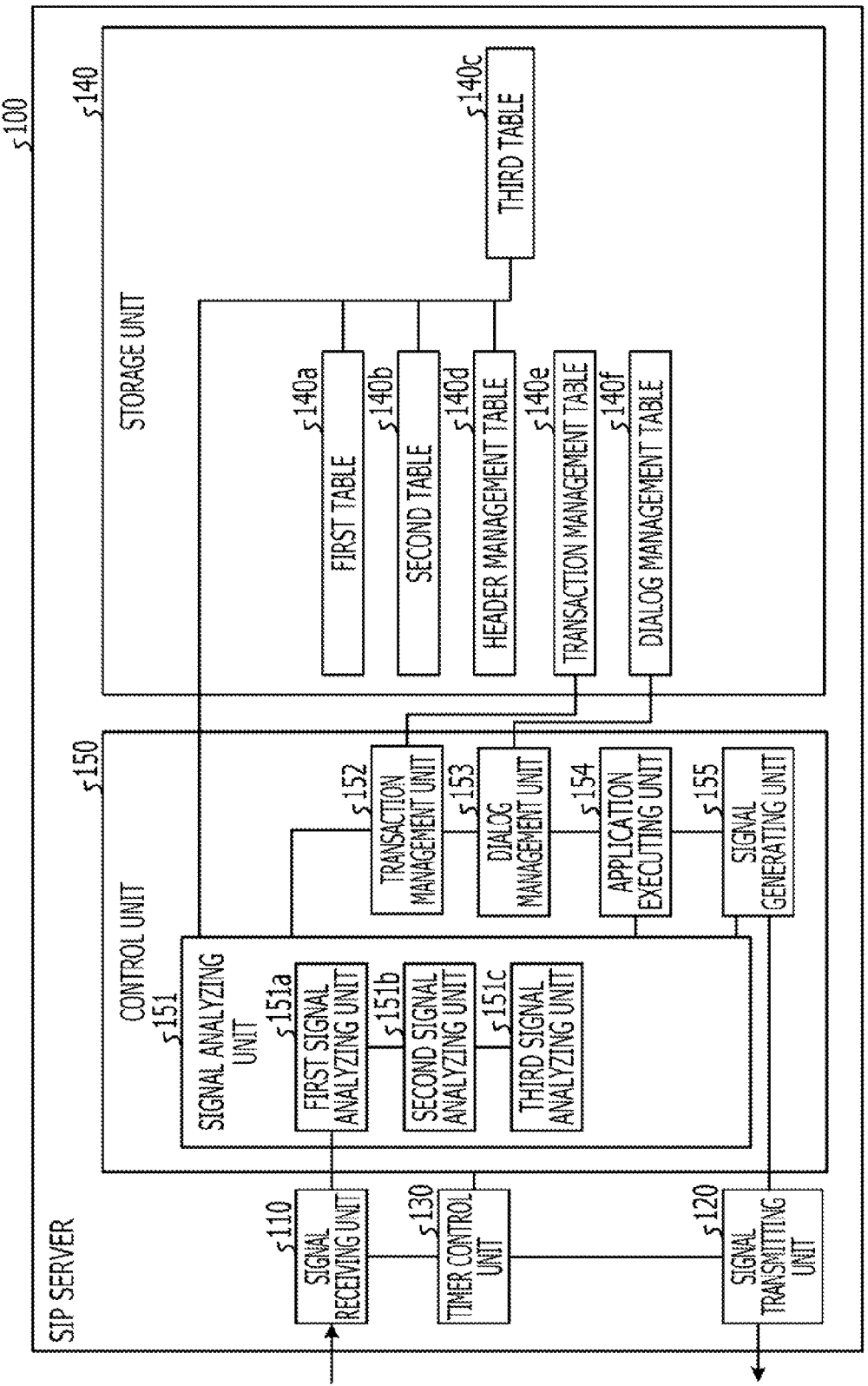
FIG. 2 is a block diagram illustrating a configuration of a SIP server according to the first embodiment.

With reference to FIG. 2, a configuration of the SIP server 100 according to the first embodiment will be described. FIG. 2 is a block diagram illustrating a configuration of a SIP server according to the first embodiment. As illustrated in FIG. 2, the SIP server 100 according to the first embodiment includes a signal receiving unit 110, a signal transmitting unit 120, a timer control unit 130, a storage unit 140 and a control unit 150.

The signal receiving unit 110 is a control unit which receives a SIP signal from the client terminals 200 and 300 and transfers the received SIP signal to the signal analyzing unit 151. There will be described an example of a signal received by the signal receiving unit 110. FIG. 3 illustrates an example of the SIP signal received by the signal receiving unit 110. As illustrated in FIG. 3, a SIP signal to be received by the signal receiving unit 110 has a request line 3001 and a header 3002.

The request line 3001 indicates the type of the received signal, and the received signal in FIG. 3 has "REGISTER" indicating that the signal is for applying IP address registration to the SIP server 100, for example. The header 3002 has a header name and a header value and designates the function required for implementing the content requested by the signal. For example, the received signal illustrated in FIG. 3 has header names "From", "Via", "Max-Forwards", "To", "CSeq", "Call-Id", "Content-Length", and "Contact".

The header name "From" indicates the logical address of the source of a request. The header name "Via" indicates information on the address at which the source of the request requests to receive a response. With reference to this, a response can be returned to the request source. The header name "Max-Forwards" indicates information on an upper limit of the number of hops. The header name "To" indicates the logical destination of the request. The header name "CSeq" indicates information on an increment value for distinction between a new transaction and a retransmission. The header name "Call-Id" indicates information on a unique ID with which a "call" is identifiable. The header name "Content-Length" indicates information on the length of the body of the header. The header name "Contact" indicates to where the request is to be transmitted next.

For example, as illustrated in FIG. 4, these kinds of information are stored in the form of "key, defined header name" such as "From, From", "Via, Via", "Max-Forwards, Max-Forwards", "To, To", and "CSeq, CSeq". A first table 140a stores information in the form of "key, defined header name" as "Call-Id, Call-Id", "Content-Length, Content-Length", and "Contact, Contact".

Here, the "key" stores a header name having a character string defined under the SIP protocol, and the "defined header name" stores a header name having a character string defined under the SIP protocol. In other words, the first table 140a stores a header name having a character string defined under the SIP protocol. FIG. 4 illustrates an example of information stored in the first table 140a. The first table 140a keeps the same content while the server is operating after the content is created upon start. One first table 140a exists within the SIP server 100.

A second table 140b stores a character string as a result of the conversion of a header name under the communication protocol to lowercase letters or uppercase letters. In other words, the second table 140b stores a header name as a result of conversion of a character string under the SIP protocol to lowercase letters. For example, the second table 140b stores information in the form of "key, defined header name" such as "from, From", "via, Via", "max-forwards, Max-Forwards", "to, To", and "cseq, CSeq" as illustrated in FIG. 5. The second table 140b further stores information in the form of "key, defined header name" such as "call-id, Call-Id", "content-length, Content-Length", and "contact, Contact".

Here, the "key" stores a result of conversion of a header name having a character string defined under SIP protocol to lowercase letters, and the "defined header name" stores a header name having a character string defined under the SIP protocol. In other words, the second table 140b stores a header name as a result of conversion of a character string defined under the SIP protocol to lowercase letters. FIG. 5 illustrates an example of information stored in the second table 140b. The second table 140b keeps the same content while the server is operating after the content is created upon start. One second table 140b exists within the SIP server 100.

Figure 6:
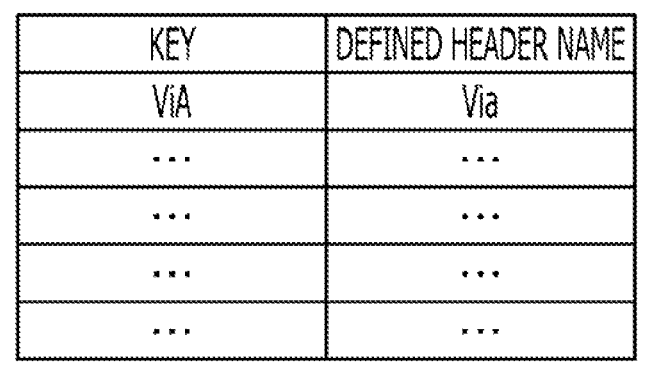

A third table 140c stores a header name extracted from a signal received in the past for each communication apparatus which has communicated with the terminal it belongs to. In this case, the header name has a character string which is defined under a communication protocol but is different from the identical character string. In other words, the third table 140c stores a header name appearing in a signal in a different form from the form defined under the SIP protocol. For example, the third table 140c stores a header name having a character string not corresponding to the "key" in the first table and second table in association with the "defined header name". The third table 140c stores a header name of a character string which is identical to that of the "key" in the second table as a result of the conversion of the character string to lowercase letters, instead of a character string under the SIP protocol. For example, the third table 140c stores "ViA, Via" as "key, defined header name" as illustrated in FIG. 6. Here, the "key" in the third table 140c stores a header name having a character string used in a received SIP signal, and the "defined header name" stores a header name having a character string under the SIP protocol. FIG. 6 illustrates an example of information stored in the third table 140c. The third table 140c is initially blank. The third table 140c is created for each source terminal.

The third table 140c may be saved in a secondary storage device by a second signal analyzing unit 151b, which will be described below, at a proper time such as the end of related communication, and the saved information may be made available for reuse. For example, the secondary storage device may be a "portable physical medium" such as a flexible disk (FD), a CD-ROM, an MO disk, a DVD disk, magneto-optical disk, and an IC card to be inserted to the SIP server 100.

A header management table 140d stores an analysis result object. For example, the header management table 140d stores a "header name" and a "header value" in association, as illustrated in FIG. 7. More specifically, the header value corresponding to the header name "From" is "'abc' <sip:abc@sipas.fujitsu.com>;tag=1838-a7-2e-8f-cd361869".
The header value corresponding to the header name "Via" is "SIP/2.0/UDP 123.456.789.012:35070; branch=z9hG4bK-07d902120e270600f0-16". The header value corresponding to the header name "Max-Forwards" is "70". FIG. 7 illustrates an example of an analysis result object stored in the header management table 140d.

A transaction management table 140e stores state information on SIP transaction processing created by the transaction management unit 152. For example, the transaction management table 140e stores a "transaction ID", a "transaction type", a "session start time", and a "state" in association, as illustrated in FIG. 8. FIG. 8 illustrates an example of information stored in the transaction management table 140e.

The "transaction ID" to be stored here stores an identifier for uniquely identifying a transaction. The "transaction type" stores a type of a received request signal such as "INVITE" which is a signal that requests to establish a session and "REGISTER" which is a signal that requests to register an IP address. The "session start time" stores the time when a request signal is received first. The "state" stores information describing the type of the signal transmitted or received last such as "END" when the session ends and "TEMPORARY RESPONSE" or "SUCCESSFUL RESPONSE" while the session is in progress.

FIG. 8 illustrates that a transaction having "0001" as the "transaction ID" has received the "INVITE" signal at 14:50:03 on March 3, 2010 and the session has been finished at present. FIG. 8 further illustrates that a transaction having "0002" as the "transaction ID" has received the "REGISTER" signal at 14:52:01 on March 3, 2010 and the session has been finished. FIG. 8 further illustrates that a transaction having "0003" as the "transaction ID" has received the "INVITE" signal at 14:52:45 on March 3, 2010 and a temporary response has been transmitted.

A dialog management table 140f stores information on a dialog created by the dialog management unit 153. For example, the dialog management table 140f stores a "dialog ID", a "Call-Id", a "From", a "To", and "call information" in association, as illustrated in FIG. 9. FIG. 9 illustrates an example of information stored in the dialog management table 140f. The dialog management table 140f is generally created separately for each dialog.

As illustrated in FIG. 9, the "dialog ID" stores an identifier for uniquely identifying a dialog, and the "Call-Id" stores information on a unique ID for identifying a "call". The "From" stores a connection source address of a dialog. The "To" stores a connection destination address of a dialog. The "call information" stores information describing a call start time and a call finish time.

For example, a dialog having "aaaaa" as a "dialog ID" involves the connection between "0010001" and "0020001" which is identified with "a-11111" as "Call-Id". The information describes that the call has started from 14:50:17 on March 3, 2010 and has ended at 14:55:23 on March 3, 2010. A dialog having "bbbbb" as a "dialog ID" involves the connection between "0010010" and "0020010" which is identified with "b-11111" as "Call-Id". The information describes that the call has started from 14:58:03 on March 3, 2010 and is currently being continued.

The control unit 150 includes an internal memory for storing a control program, a program which defines a processing routine, and necessary data. The control unit 150 further includes a signal analyzing unit 151, a transaction management unit 152, a dialog management unit 153, an application executing unit 154 and a signal generating unit 155. For example, the control unit 150 may be an integrated circuit such as an ASIC (Application Specific Integrated Circuit) and an FPGA (Field Programmable Gate Array) or an electronic circuit such as a CPU (Central Processing Unit) and an MPU (Micro Processing Unit).

The signal analyzing unit 151 is a control unit which analyzes a signal and generates an analysis result object and includes a first signal analyzing unit 151a, a second signal analyzing unit 151b, and a third signal analyzing unit 151c. The signal analyzing unit 151 extracts the corresponding header value from an analysis result object for the header name designated from the application executing unit 154 and transmits the extracted header value to the application executing unit 154.

The first signal analyzing unit 151a determines whether the identical character string to that of a header name contained in a received signal from another communication apparatus is stored in the first table 140a or not. If so, the first signal analyzing unit 151a extracts the header value corresponding to the header name from the received signal. In other words, the first signal analyzing unit 151a is a control unit which extracts a header name from a SIP signal received by the signal receiving unit 110 and determines whether the extracted header name exists in the first table 140a or not. For example, if the first signal analyzing unit 151a determines that the extracted header name exists in the first table 140a, the first signal analyzing unit 151a extracts the corresponding header value from the extracted header name and creates the analysis result object. If the first signal analyzing unit 151a determines that the extracted header name does not exist in the first table 140a, the first signal analyzing unit 151a transfers the received SIP signal to the second signal analyzing unit 151b.

More specifically, for example, when a SIP signal illustrated in FIG. 10 is received by the signal receiving unit 110, the first signal analyzing unit 151a extracts the header name "From". The first signal analyzing unit 151a searches through items of the "key" in the first table 140a illustrated in FIG. 4 and determines whether any header name having the identical character string to the extracted header name "From" exists therein or not. The first signal analyzing unit 151a determines the item "From" of the "key" in the first table 140a and the extracted header name "From" have the identical character string. FIG. 10 illustrates an example of a SIP signal to be analyzed by the signal analyzing unit 151.

Next, the first signal analyzing unit 151a extracts the defined header name "From" from items of the "defined header name" corresponding to the item "From" of "From" in the first table 140a. The first signal analyzing unit 151a then extracts from the received signal the header value "'abc' <sip:abc@sipas.fujitsu.com>;tag=1838-a7-2e-8f-cd361869" corresponding to the extracted header name "From". The first signal analyzing unit 151a then stores the defined header name "From" and the header value "'abc' <sip:abc@sipas.fujitsu.com>;tag=1838-a7-2e-8f-cd361869" in association to the analysis result object.

Then, the first signal analyzing unit 151a extracts the header name "ViA" from the received SIP signal. The first signal analyzing unit 151a searches through items of the "key" in the first table 140a and may determine that no header name having the identical character string to that of the extracted header name "ViA" exists in the items of the "key" in the first table 140a.

In the same manner, the first signal analyzing unit 151a may determine that "Max-Forwards", "To" and "CSeq" exist in the first table 140a. AS the result, the first signal analyzing unit 151a stores the defined header name "Max-Forwards" and a header value "70" in association to the analysis result object. The first signal analyzing unit 151a further stores the defined header name "To" and the header value "<sip:abc@sipas.fujitsu.com>" in association to the analysis result object. The first signal analyzing unit 151a stores the defined header name "CSeq" and a header value "16 REGISTER" in association to the analysis result object.

In the same manner, the first signal analyzing unit 151a may determine no "Call-ID No" exists in the first table 140a. The first signal analyzing unit 151a may further determine that "Content-Length" exists in the first table 140a. As a result, the first signal analyzing unit 151a stores the defined header name "Content-Length" and a header value "0" in association to the analysis result object.

In the same manner, the first signal analyzing unit 151a may determine that no "conTact" exists in the first table 140a. The first signal analyzing unit 151a transfers the received SIP signal to the second signal analyzing unit 151b.

In other words, the first signal analyzing unit 151a determines that "From", "Max-Forwards", "To", "CSeq" and "Content-Length" exist in the first table 140a. As a result, the first signal analyzing unit 151a creates analysis result objects for "From", "Max-Forwards", "To", "CSeq" and "Content-Length". The first signal analyzing unit 151a transfers the received SIP signal to the second signal analyzing unit 151b.

If the application executing unit 154 designates a header name, the first signal analyzing unit 151a is a control unit which determines whether the designated header name exists in the first table 140a or not. For example, if the first signal analyzing unit 151a determines that the designated header name exists in the first table 140a, the first signal analyzing unit 151a extracts the header value corresponding to the designated header name from the analysis result object and transmits the extracted header value to the application executing unit 154. If the first signal analyzing unit 151*a* determines that the designated header name does not exist in the first table 140*a*, the first signal analyzing unit 151*a* transfers the designated header name to the second signal analyzing unit 151*b*.

If the first signal analyzing unit 151*a* determines that the first table 140*a* does not store it, the second signal analyzing unit 151*b* determines whether the identical character string to that of the header name contained in the received signal is stored in the third table 140*c* or not. If so, the second signal analyzing unit 151*b* extracts the header value corresponding to the header name from the received signal. In other words, the second signal analyzing unit 151*b* is a control unit which determines whether the header name extracted from a received SIP signal exists in the third table 140*c* or not. For example, if the second signal analyzing unit 151*b* determines that the extracted header name exists in the third table 140*c*, the second signal analyzing unit 151*b* extracts the header value corresponding to the extracted header name and creates an analysis result object. If the second signal analyzing unit 151*b* determines that the extracted header name does not exist in the third table 140*c*, the second signal analyzing unit 151*b* transfers the received signal to the third signal analyzing unit 151*c*. The second signal analyzing unit 151*b* can determine whether the header name analysis has finished or not by searching the corresponding analysis result object. Thus, the second signal analyzing unit 151*b* can extract the header name which has not undergone the analysis and analyzes the extracted header name.

More specifically, the second signal analyzing unit 151*b* searches through analysis result objects and extracts header names "ViA", "Call-ID No" and "conTact" which are determined as not being stored in the first table 140*a* from the received SIP signal. If the second signal analyzing unit 151*b* receives a signal, the second signal analyzing unit 151*b* determines whether the source has the corresponding third table 140*c* or not.

For example, the second signal analyzing unit 151*b* may determine that the source has the corresponding third table 140*c*, the second signal analyzing unit 151*b* searches through items of the "key" in the third table 140*c* illustrated in FIG. 6 and determines whether the header name having the identical character string to that of the extracted header name "ViA" exists therein or not. The second signal analyzing unit 151*b* may determine that the item "ViA" of the "key" in the third table 140*c* and the extracted header name "ViA" have the identical character string.

Next, the second signal analyzing unit 151*b* extracts the defined header name "Via" from items of the "defined header name" corresponding to the item "VIA" of the "key" in the third table 140*c*. The second signal analyzing unit 151*b* then extracts the header value "SIP/2.0/UDP 123.456.789.012: 35070; branch=z9hG4bK-07d902120e270600f0-16" corresponding to the extracted header name "ViA" from the received signal. The second signal analyzing unit 151*b* stores the defined header name "Via" and the header value "SIP/2.0/ UDP 123.456.789.012:35070; branch=z9hG4bK-07d902120e270600f0-16" in association to the analysis result object.

The second signal analyzing unit 151*b* searches through items of the "key" in the third table 140*c* and determines whether any header name exists which has the identical character string to that of the extracted header name "Call-ID No" or not. The second signal analyzing unit 151*b* may determine that the identical character string to that of the extracted header name "Call-ID No" does not exist in the items of the "key" in the third table 140*c*. In the same manner, the second signal analyzing unit 151*b* may determine that "conTact" does not exist in the third table 140*c*. The second signal analyzing unit 151*b* then transfers the received SIP signal to the third signal analyzing unit 151*c*.

If the second signal analyzing unit 151*b* determines that the source does not have the corresponding third table 140*c*, the second signal analyzing unit 151*b* transfers the received SIP signal to the third signal analyzing unit 151*c*.

The second signal analyzing unit 151*b* is a control unit which determines whether the designated header name exists in the third table 140*c* or not if the first signal analyzing unit 151*a* determines that the header name designated by the application executing unit 154 does not exist in the first table 140*a*. For example, if the second signal analyzing unit 151*b* determines that the designated header name exists in the third table 140*c*, the second signal analyzing unit 151*b* extracts the header value corresponding to the designated header name from the analysis result object and transmits the extracted header value to the application executing unit 154. If the second signal analyzing unit 151*b* determines that the designated header name does not exist in the third table 140*c*, the second signal analyzing unit 151*b* transfers the header name to the third signal analyzing unit 151*c*.

If the source stores the corresponding third table 140*c* in a secondary storage device such as a file, the second signal analyzing unit 151*b* may read the corresponding third table 140*c* from the secondary storage device to the source.

If the second signal analyzing unit 151*b* determines that the header name is not stored in the third table 140*c*, the third signal analyzing unit 151*c* converts the character string of the header name contained in the received signal to uppercase letters or lowercase letters. The third signal analyzing unit 151*c* determines whether the identical character string to that of the converted header name is stored in the second table 140*b* or not. If so, the third signal analyzing unit 151*c* extracts the header value corresponding to the header name from the received signal. In other words, the third signal analyzing unit 151*c* is a control unit which converts the character string of the extracted header name to lowercase letters or uppercase letters and determine whether the extracted header name exists in the second table 140*b* or not. For example, the third signal analyzing unit 151*c* may convert the character string of the received header name to lowercase letters and determines whether the header name of the converted character string exists in the second table 140*b* or not.

If the third signal analyzing unit 151*c* determines that the header name having the converted character string does not exist in the second table 140*b*, the third signal analyzing unit 151*c* extracts the corresponding header value from the header name of the character string and creates an analysis result object. On the other hand, if the third signal analyzing unit 151*c* determines that the identical character string to that of the header name contained in the received signal is stored in the second table 140*b*, the third signal analyzing unit 151*c* stores the header name to the third table 140*c*. The third signal analyzing unit 151*c* may search through the analysis result objects to determine whether the header name analysis has finished or not. Thus, the third signal analyzing unit 151*c* may extract the header name which has not been analyzed yet and analyze the extracted header name.

More specifically, the third signal analyzing unit 151*c* may search through analysis result objects and extracts the header names "Call-ID No" and "conTact" which are determined as not being stored in the first table 140*a* and third table 140*c*.

The third signal analyzing unit 151*c* converts the character string of the extracted header name "Call-ID No" to "call-id no". The third signal analyzing unit 151*c* searches through items of the "key" in the second table 140b and determines whether any header name having the identical character string to that of the header name having the converted character string "call-id no" exists or not. The third signal analyzing unit 151c may determine that the items of the "key" in the second table 140b do not include the identical character string to the converted character string "call-id no" of the header name. In this case, for "call-id no", the third signal analyzing unit 151c extracts the corresponding header value "07d902120e270600f0@123.456.789.012" from the received signal. The third signal analyzing unit 151c stores the header name "call-id no" resulting from the conversion of the character string to lowercase letters and the header value "07d902120e270600f0@123.456.789.012" in association to the analysis result object.

The third signal analyzing unit 151c further converts the character string of the extracted header name "conTact" to "contact". The third signal analyzing unit 151c searches through items of the "key" in the second table 140b and determines whether any header name having the identical character string to the converted character string "contact" of the header name exists or not. The third signal analyzing unit 151c may then determine that the item "contact" of the "key" in the second table 140b and the header name "contact" having the converted character string have the identical character string.

Next, the third signal analyzing unit 151c extracts a defined header name "Contact" from the items of the "defined header name" corresponding to the item "contact" of the "key" in the second table 140b. The third signal analyzing unit 151c then extracts from the received signal the header value "<sip:abc@123.456.789.012:35070>" corresponding to the extracted header name "conTact". The third signal analyzing unit 151b stores the defined header name "Contact" and the header value "<sip:abc@123.456.789.012:35070>" in association to the analysis result object. The analysis result object created after the storage by the third signal analyzing unit 151c is illustrated in FIG. 12. FIG. 12 illustrates an example of the analysis result object created by the signal analyzing unit 151. The third signal analyzing unit 151c stores, as illustrated in FIG. 11, information having correspondence between the header name "conTact" of a received SIP signal and the header name "Contact" of the defined character string to the third table 140c. FIG. 11 illustrates an example of information stored in the third table by the signal analyzing unit.

The third signal analyzing unit 151c converts the character string of a designated header name to lowercase letters or uppercase letters and determines whether the designated header name exists in the second table 140b or not. For example, the third signal analyzing unit 151c may convert the character string of a designated header name to lowercase letters and determine whether the header name having the converted character string exists in the second table 140b or not. If the third signal analyzing unit 151c determines that the header name having the converted character string exists in the second table 140b, the third signal analyzing unit 151c extracts the defined header name corresponding to the designated header name. The third signal analyzing unit 151c extracts the header value corresponding to the defined header name from the analysis result object and transmits the extracted header value to the application executing unit 154. On the other hand, if the third signal analyzing unit 151c determines that the header name having the converted character string does not exist in the second table 140b, the third signal analyzing unit 151c extracts the header value corresponding to the header name having the converted character string from the analysis result object. The third signal analyzing unit 151c then transmits the extracted header value to the application executing unit 154.

The third signal analyzing unit 151c may save the third table 140c to a secondary storage device at a proper time such as the end of related communication. For example, the secondary storage device may be a "portable physical medium" to be inserted to the SIP server 100, such as a flexible disk (FD), a CD-ROM, an MO disk, a DVD disk, a magneto-optical disk, and an IC card.

The transaction management unit 152 is a control unit which manages a processing state of a transaction. For example, the transaction management unit 152 extracts a "transaction type", a "session start time" and a "state" from a request signal which requests a process and a response signal which responds thereto and writes them to the transaction management table 140e.

The dialog management unit 153 is a control unit which manages the connection relationship between connected terminals and may manage information on, for example, a call state between the client terminal 200 and the client terminal 300. For example, the dialog management unit 153 may extract information on the "Call-Id", "From" and "To" from headers contained in the signal and creates a dialog management table 140f.

The application executing unit 154 is a control unit which executes an application on the connected client terminal 200 and client terminal 300. For example, the application executing unit 154 reads an application stored in the storage unit 140 and executes a process defined by the application on the connected client terminals. The application executing unit 154 further uses an API to designate a header name to the signal analyzing unit 151 and acquires the header value corresponding to the designated header name.

The signal generating unit 155 is a control unit which generates a signal and transfers the generated signal to the signal transmitting unit 120. For example, the signal generating unit 155 may generate a new signal by updating the header of a received SIP signal. The signal generating unit 155 generates a new signal from the process executed by the application executing unit 154.

[Processing Routine of Header Processing on SIP Signal by SIP Server 100]

Figure 13:
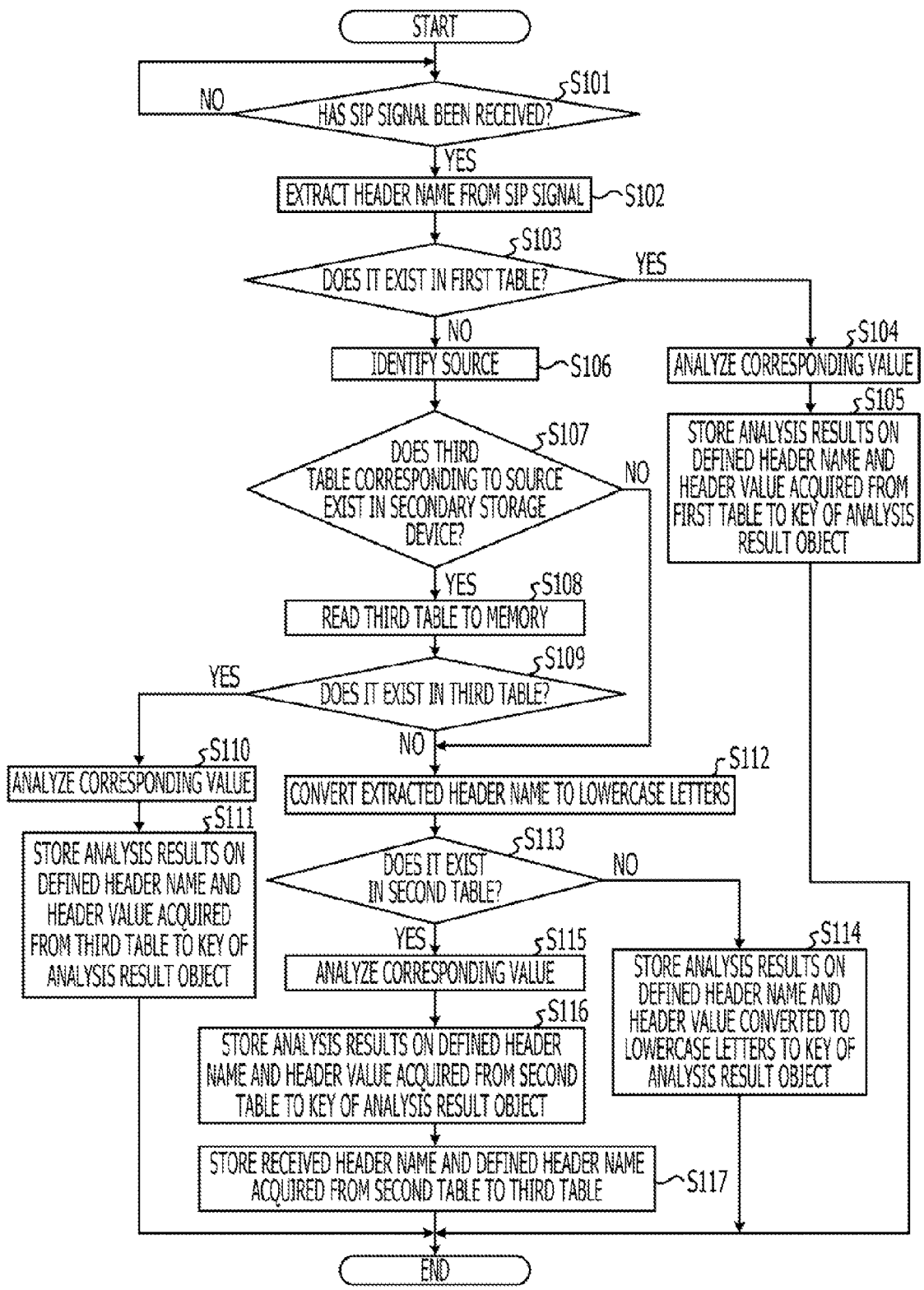
FIG. 13 is a flowchart illustrating a processing routine of SIP signal analysis processing by the signal analyzing unit when a SIP signal is received.

With reference to FIG. 13, a processing routine of header processing by the SIP server 100 will be described. FIG. 13 is a flowchart illustrating a processing routine of SIP signal analysis processing by the signal analyzing unit when a SIP signal is received. As illustrated in FIG. 13, in the SIP server 100, if the signal receiving unit 110 determines that a SIP signal is received (step S101, Yes), the signal receiving unit 110 transfers the received SIP signal to the first signal analyzing unit 151a. The first signal analyzing unit 151a extracts a header name from the received SIP signal (step S102) and determines whether the extracted header name exists in the first table 140a or not (step S103). If the first signal analyzing unit 151a determines that the extracted header name exists in the first table 140a (step S103, Yes), the first signal analyzing unit 151a analyzes the header value corresponding to the header name (step S104). The first signal analyzing unit 151a then stores the analysis result to the analysis result object (step S105).

On the other hand, if the first signal analyzing unit 151a determines that the extracted header name does not exist in the first table 140a (step S103, No), the first signal analyzing unit 151a transfers the received SIP signal to the second signal analyzing unit 151b. The second signal analyzing unit 151b identifies the source from the SIP signal (step S106) and determines whether the third table 140c corresponding to the identified source exists in the secondary storage device or not (step S107). If the second signal analyzing unit 151b determines that the third table 140c corresponding to the source does not exist in the secondary storage device (step S107, No), the second signal analyzing unit 151b transfers the received SIP signal to the third signal analyzing unit 151c. The third signal analyzing unit 151c extracts a header name from the received SIP signal and converts the character string of the extracted header name to lowercase letters (step S112).

If the second signal analyzing unit 151b determines that the third table 140c corresponding to the identified source exist on the secondary storage device (step S107, Yes), the second signal analyzing unit 151b reads the information in the third table 140c to memory (step S108). The second signal analyzing unit 151b then extracts a header name from the received SIP signal and determines whether the extracted header name exists in the third table 140c or not (step S109). If the second signal analyzing unit 151b determines here that the extracted header name exists in the third table 140c (step S109, Yes), the second signal analyzing unit 151b analyzes the header value corresponding to the header name (step S110). The second signal analyzing unit 151b then stores the analysis result to the analysis result object (step S111).

On the other hand, if the second signal analyzing unit 151b determines that the extracted header name does not exist in the third table 140c (step S109, No), the second signal analyzing unit 151b transfers the received SIP signal to the third signal analyzing unit 151c. The third signal analyzing unit 151c extracts the header name from the received SIP signal and converts the character string of the extracted header name to lowercase letters (step S112).

The third signal analyzing unit 151c determines whether the header name having the character string converted to lowercase letters exists in the second table 140b or not (step S113). If the third signal analyzing unit 151c determines here that the corresponding header name exists in the second table 140b (step S113, No), the third signal analyzing unit 151c stores the analysis result to the analysis result object (step S114).

On the other hand, if the third signal analyzing unit 151c determines that the header name having the character string converted to lowercase letters exists in the second table 140b (step S113, Yes), the third signal analyzing unit 151c extracts the corresponding header value (step S115) and stores the analysis result to the analysis result object (step S116). The third signal analyzing unit 151c then stores in the third table 140c the header name having the character string extracted from the header of the received SIP signal and the header name having the defined character string extracted from the second table 140b (step S117).

[Processing Routine of Processing on Header Value Acquisition Request from Application Executing Unit 154 by SIP Server 100]

Figure 14:
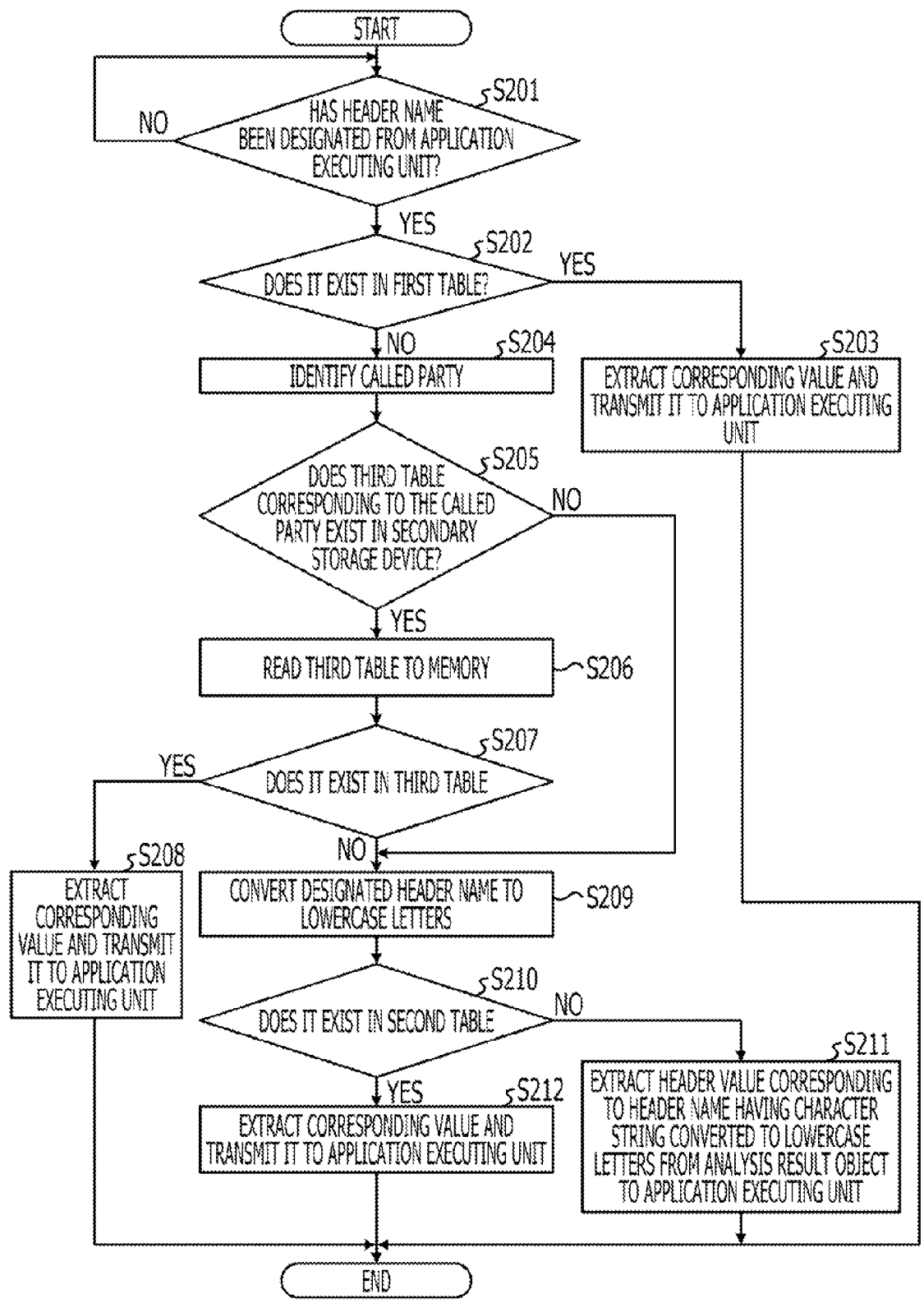
FIG. 14 illustrates a processing routine of header value acquisition processing by the signal analyzing unit when the acquisition of the header value corresponding to the header name designated from an application executing unit is requested.

With reference to FIG. 14, there will be described a processing routine of processing on a header value acquisition request from the application executing unit 154 by the SIP server 100. FIG. 14 illustrates a processing routine of processing on header value acquisition request from the application executing unit 154 by the SIP server 100. As illustrated in FIG. 14, if the application executing unit 154 designates a header name (step S201, Yes), the first signal analyzing unit 151a determines whether the designated header name exists in the first table 140a or not (step S202). If the first signal analyzing unit 151a determines that the designated header name exists in the first table 140a (step S202, Yes), the first signal analyzing unit 151a extracts the corresponding header value from the analysis result object and transmits it to the application executing unit 154 (step S203).

On the other hand, if the first signal analyzing unit 151a determines that the designated header name does not exist in the first table (step S202, No), the first signal analyzing unit 151a transfers the designated header name to the second signal analyzing unit 151b. The second signal analyzing unit 151b identifies the called party (step S204) and determines whether the third table 140c corresponding to the identified called party exists in the secondary storage device or not (step S205). If the second signal analyzing unit 151b determines that the third table 140c corresponding to the called party does not exist in the secondary storage device (step S205, No), the second signal analyzing unit 151b transfers the designated header name to the third signal analyzing unit 151c. The third signal analyzing unit 151c then converts the character string of the designated header name to lowercase letters (step S209).

If the second signal analyzing unit 151b determines that the third table 140c corresponding to the identified called party exists in the secondary storage device (step S205, Yes), the second signal analyzing unit 151b reads information in the third table 140c to memory (step S206). The second signal analyzing unit 151b then determines whether the designated header name exists in the third table 140c or not (step S207). If the second signal analyzing unit 151b determines that the designated header name exists in the third table 140c (step S207, Yes), the second signal analyzing unit 151b extracts the corresponding header value from the analysis result object and transmits it to the application executing unit 154 (step S208).

On the other hand, if the second signal analyzing unit 151b determines that the designated header name does not exist in the third table 140c (step S207, No), the second signal analyzing unit 151b transfers the designated header name to the third signal analyzing unit 151c. The third signal analyzing unit 151c converts the character string of the designated header name to lowercase letters (step S209).

The third signal analyzing unit 151c determines whether the header name having the character string converted to lowercase letters exists in the second table 140b or not (step S210). If the third signal analyzing unit 151c here determines that the corresponding header name does not exist in the second table 140b (step S210, No), the third signal analyzing unit 151c extracts the header value corresponding to the header name having the character string converted to lowercase letters from the analysis result object. The third signal analyzing unit 151c transmits the extracted header value to the application executing unit 154 (step S211).

On the other hand, if the third signal analyzing unit 151c determines that the header name having the character string converted to lowercase letters exists in the second table (step S210, Yes), the third signal analyzing unit 151c extracts the corresponding header value from the analysis result object. The third signal analyzing unit 151c transmits the extracted header value to the application executing unit 154 (step S212).

Effects of First Embodiment

As described above, according to the first embodiment, the first signal analyzing unit 151a extracts a header name from the SIP signal received by the signal receiving unit 110 and determines whether the extracted header name exists in the first table 140a or not. If the first signal analyzing unit 151a determines that the extracted header name does not exist in the first table 140a, the first signal analyzing unit 151a transfers the received SIP signal to the second signal analyzing unit 151*b*. The second signal analyzing unit 151*b* extracts the header name from the received SIP signal and determines whether the extracted header name exists in the third table 140*c* or not. If the second signal analyzing unit 151*b* determines that the extracted header name does not exist in the third table 140*c*, the second signal analyzing unit 151*b* transfers the received SIP signal to the third signal analyzing unit 151*c*. The third signal analyzing unit 151*c* extracts the header name from the received SIP signal and converts the character string of the extracted header name to lowercase letters. The third signal analyzing unit 151*c* determines whether the character string converted to lowercase letters of the header name exists in the second table 140*b* or not. If the third signal analyzing unit 151*c* determines that the character string converted to lowercase letters of the header name exists in the second table 140*b*, the third signal analyzing unit 151*c* stores the character string of the defined header name extracted from the second table 140*b* and the character string of the header name of the received signal in association to the third table 140*c*.

In other words, the SIP server 100 according to the embodiment stores a header name having a character string which is different from the character string under the SIP protocol in the third table 140*c*. Thus, if the SIP server 100 receives SIP signal containing a header name having a character string which is different from the character string under the SIP protocol, the SIP server 100 may search through the third table 140*c* for a header name having a character string converted once to extract the header name having the defined character string. As a result, the SIP server 100 can efficiently perform signal header analysis processing.

Because the SIP server 100 according to the embodiment is not required to re-convert the character string converted once of a header name, the frequency of occurrence of a throwaway character string object can be reduced when Java (registered trademark) language is implemented. As a result, because the SIP server 100 can reduce the frequency of occurrence of garbage collection, the processing performance of the SIP server can be improved.

The SIP server 100 according to the embodiment can store a third table 140*c* created for each source to a secondary storage device. Thus, the memory leak can be avoided. As a result, the SIP server 100 can improve the efficiency of use of memory.

Other Embodiments

A SIP server disclosed by the subject application may be implemented in various different forms alternatively to the aforementioned embodiment. An information processing apparatus disclosed by the subject application according to other embodiments will be described.

[System Configuration, Etc.]

All or a part of processes described as being performed automatically of processes according to the aforementioned embodiment may also be performed manually. Alternatively, all or a part of processes described as being performed manually may be performed automatically by a publicly known method. In addition, the described and/or illustrated processing routines, control routines, and/or specific names may be changed arbitrarily unless otherwise indicated.

The illustrated components are functional and conceptual and may not typically be required to configure physically as illustrated. For example, the signal receiving unit 110 and the first signal analyzing unit 151*a* may be integrated. All or an arbitrary part of processing functions to be performed in apparatuses may be implemented by a CPU or a program to be analyzed and executed by the CPU or may be implemented by hardware with a wired logic. The information stored in the illustrated storage units are given for illustration purpose only, and the information is not typically required to store as illustrated.

Having described according to the aforementioned embodiment that the server is a SIP server, the server is not limited to a SIP server. For example, the server may be an HTTP (Hyper Text Transfer Protocol) server if it performs analysis processing on a header given to a packet.

[Program]

The processes described according to the aforementioned embodiment may be implemented by causing a computer system such as a personal computer and a workstation to execute a prepared program. Hereinafter, there will be described an example of the computer system which executes a program having the same function as that of the aforementioned embodiment.

Figure 15:
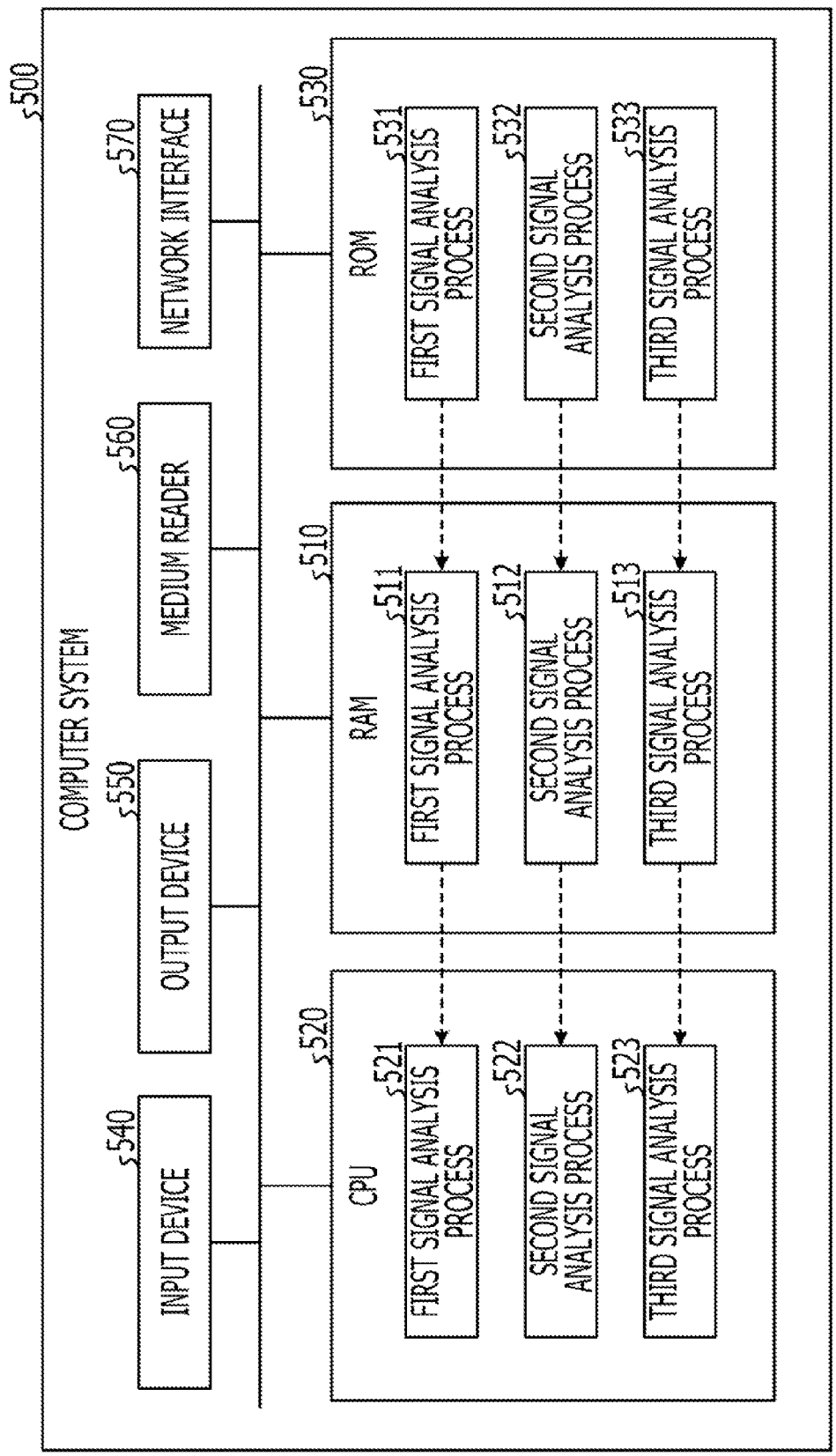
FIG. 15 illustrates a computer system which executes a signal analysis program.
Figure 17:
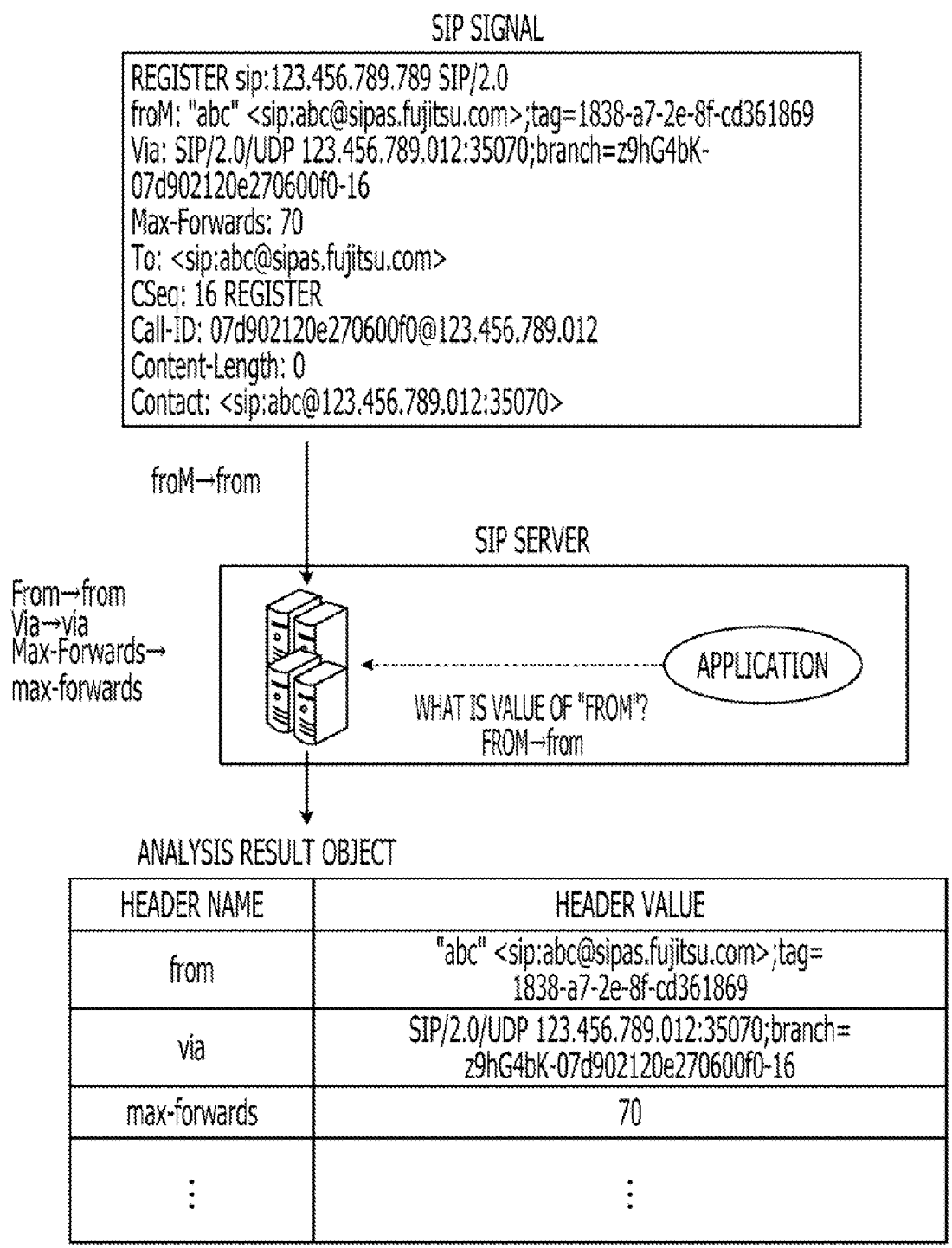
FIG. 17 illustrates an example of the method which coercively converts a header name contained in a SIP signal to uppercase letters or lowercase letters.

FIG. 15 illustrates a computer system which executes a signal analysis program. As illustrated in FIG. 15, a computer system 500 includes a RAM 510, a ROM 530, and a CPU 520. The ROM 530 prestores a program which implements the same function as that of the aforementioned embodiment. In other words, as illustrated in FIG. 15, the ROM 530 prestores a first signal analysis program 531, a second signal analysis program 532, and a third signal analysis program 533.

The CPU 520 reads the program 531 to 533 and expands them to the RAM 510. The CPU 520 executes the first signal analysis program 531 as a first signal analysis process 521. The CPU 520 executes the second signal analysis program 532 as a second signal analysis process 522 and executes the third signal analysis program 533 as a third signal analysis process 523. The first signal analysis process 521 corresponds to the first signal analyzing unit illustrated in FIG. 2. The second signal analysis process 522 corresponds to the second signal analyzing unit. The third signal analysis process 523 corresponds to the third signal analyzing unit.

The programs 531 to 533 may not typically be required to store in the ROM 530. For example, they may be stored in a "portable physical medium" to be inserted to the computer system 500, such as a flexible disk (FD), a CD-ROM, an MO disk, a DVD disk, a magneto-optical disk, and an IC card. Alternatively, they may be stored in a "fixed physical medium" to be provided internally or externally to the computer system 500 such as a hard disk drive (HDD). They may be stored in "other computer systems" connected to the computer system 500 through a public switched line, the Internet, a LAN (Local Area Network), and a WAN (Wide Area Network). The computer system 500 then may read and execute the programs.

In other words, programs according to other embodiments may be stored in a computer-readable manner in a recording medium such as a "portable physical medium", a "fixed physical medium", and a "communication medium" as described above. The computer system 500 may implement the same functions as those of the aforementioned embodiments by reading and executing programs from a recording medium as described above. The programs according to other embodiments are not limited to those to be executed by the computer system 500. For example, the present invention is also applicable to cases where another computer system or server executes a program or a combination of them execute a program.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An apparatus that identifies a setting in a communication complying with a specific rule from a received signal on a basis of an identifier that is defined in the specific rule and associated with the setting, the apparatus comprising:
   a memory; and
   a processor coupled to the memory and configured to:
      associate a first character string in a first received signal with the identifier in a case that converted characters of the first character string, which are generated by converting at least one of characters of the first character string by one of capitalization and lowercase conversions, are identical to characters of the identifier;
      determine whether a second character string in a second received signal corresponds to the identifier, in a case that characters of the second character string are identical to the characters of the first character string associated with the identifier, wherein
         the second received signal is received after the first received signal, and
         the characters of the identifier to be identical to the converted characters of the first character string are converted characters of the identifier which are generated by converting the characters of the identifier by at least one of the capitalization and the lowercase conversions;
      extract a header name from the received signal; and
      determine whether the extracted header name exists in a table, wherein
         in a case where the extracted header name is determined to not exist in the table, the processor is further configured to:
            identify a source from the received signal, and
            determine whether another table corresponding to the identified source exists in another memory, and
         in a case where the extracted header name is determined to exist in the table, the processor is further configured to:
            analyze a header value corresponding to the extracted header name, and
            store a result of the analysis.

2. The apparatus of claim 1, wherein all characters of the converted characters of the first character string and all of the characters of the converted characters of the identifier are one of uppercase letters and lowercase letters.

3. The apparatus of claim 1, wherein the processor is configured to determine whether the second character string in the second received signal corresponds to the identifier, in a case that the characters of the second character string are identical to the characters of the first character string associated with the identifier, with consideration for lowercase letters and uppercase letters in each of the characters of the first character string and in each of the characters of the second character string.

4. The apparatus of claim 3, wherein the memory is further configured to:
   store a first association between the identifier and the characters of the identifier, and
   determine whether the characters of the second character string are identical to the characters of the identifier on a basis of the first association.

5. The apparatus of claim 1, wherein the processor is further configured to:
   determine whether the characters of the second character string are identical to the characters of the identifier before determining whether the characters of the second character string correspond to the characters of the first character string, and
   determine whether the characters of the second character string correspond to the characters of the first character string, in a case that the characters of the second character string are determined to not be identical to the characters of the identifier.

6. The apparatus of claim 1, wherein the processor is further configured to:
   convert the characters of the second character string to converted characters of the second character string by at least one of the capitalization and the lowercase conversions in a case that the character of the second character string is not identical to the characters of the first character string; and
   determine whether the second character string corresponds to the identifier in a case that the converted characters of the second character string are identical to the converted characters of the identifier.

7. The apparatus of claim 6, wherein the processor is further configured to associate the second character string with the identifier, in a case that the converted characters of the second character string are identical to the converted characters of the identifier.

8. The apparatus of claim 6, wherein the memory is further configured to:
   store a second association between the identifier and the converted characters of the identifier, and
   determine whether the converted characters of the second character string are identical to the converted characters of the identifier on a basis of the second association.

9. The apparatus of claim 1, wherein the processor is further configured to:
   store a third association between the identifier and the characters of the first character string in the memory, in a case that the converted characters of the first string are identical to the characters of the identifier, and
   determine whether the characters of the second character string are identical to the characters of the first character string associated with the identifier on a basis of the third association.

10. The apparatus of claim 9, wherein the processor is configured to store the third association in respective communication apparatus that communicates with the apparatus.

11. The apparatus of claim 1, wherein the specific rule is a specific communication protocol.

12. The apparatus of claim 11, wherein
   the specific communication protocol is Session Initiation Protocol,
   the identifier is a header name defined on a basis of the Session Initiation Protocol, and
   the setting is a header value associated with the header name.

13. The apparatus of claim 1, wherein the first character string is at a specific position in the first received signal.

14. The apparatus of claim 13, wherein
   the first received signal is recognized as a text, the specific position is between a line break and a colon in the text, and the first character string is between the line break and the colon in the text.

15. The apparatus of claim 1, wherein the first received signal is a communication request that is transmitted from a first communication apparatus to establish a communication with a second communication apparatus.

16. The apparatus of claim 15, wherein the apparatus relays a signal between the first communication apparatus and the second communication apparatus.

17. A non-transitory computer-readable medium including a program, which when executed by a computer that identifies a setting in a communication complying with a specific rule from a received signal on a basis of an identifier that is defined in the specific rule and associated with the setting, causes the computer to:

associate a first character string in a first received signal with the identifier in a case that converted characters of the first character string, which are generated by converting at least one of characters of the first character string by one of capitalization and lowercase conversions, are identical to characters of the identifier;

determine whether a second character string in a second received signal corresponds to the identifier, in a case that characters of the second character string are identical to the characters of the first character string associated with the identifier, wherein the second received signal is received after the first received signal, and the characters of the identifier to be identical to the converted characters of the first character string are converted characters of the identifier which are generated by converting the characters of the identifier by at least one of the capitalization and the lowercase conversions;

extract a header name from the received signal; and determine whether the extracted header name exists in a table, wherein in a case where the extracted header name is determined to not exist in the table, the program further causes the computer to:

identify a source from the received signal, and determine whether another table corresponding to the identified source exists in another memory, and in a case where the extracted header name is determined to exist in the table, the program further causes the computer to:

analyze a header value corresponding to the extracted header name, and store a result of the analysis.

18. A method of identifying a setting in a communication complying with a specific rule from a received signal on a basis of an identifier that is defined in the specific rule and associated with the setting, the method comprising:

associating a first character string in a first received signal with the identifier in a case that converted characters of the first character string, which are generated by converting at least one of characters of the first character string by one of capitalization and lowercase conversions, are identical to characters of the identifier;

determining whether a second character string in a second received signal corresponds to the identifier, in a case that characters of the second character string are identical to the characters of the first character string associated with the identifier, wherein the second received signal is received after the first received signal, and the characters of the identifier to be identical to the converted characters of the first character string are converted characters of the identifier which are generated by converting the characters of the identifier by at least one of the capitalization and the lowercase conversions;

extracting a header name from the received signal;

determining whether the extracted header name exists in a table, wherein in a case where the extracted header name is determined to not exist in the table, the method further comprises:

identifying a source from the received signal, and determining whether another table corresponding to the identified source exists in another memory, and in a case where the extracted header name is determined to exist in the table, the method further comprises:

analyzing a header value corresponding to the extracted header name, and storing a result of the analysis.

* * * * *